United States Patent [19]

Veltman et al.

[11] 4,162,926

[45] Jul. 31, 1979

[54] METHOD OF DRYING COMPLEX SUGAR SOLUTIONS

[75] Inventors: Preston L. Veltman, Severna Park; John J. Blouin, Catonsville, both of Md.

[73] Assignee: W. R. Grace & Co., New York, N.Y.

[21] Appl. No.: 868,661

[22] Filed: Jan. 11, 1978

[51] Int. Cl.[2] ........................... B01D 1/18; C13F 1/00

[52] U.S. Cl. ........................................... 127/62; 127/9; 127/15

[58] Field of Search .................... 127/15, 16, 9, 61–63

[56] References Cited

U.S. PATENT DOCUMENTS

| | | | |
|---|---|---|---|
| 3,600,222 | 8/1971 | Veltman et al. | 127/62 X |
| 3,704,169 | 11/1972 | Andersen | 127/58 X |
| 3,706,599 | 12/1972 | Woodruff et al. | 127/58 X |
| 3,956,009 | 5/1976 | Lundquist, Jr. et al. | 127/62 |

*Primary Examiner*—Morris O. Wolk
*Assistant Examiner*—Michael S. Marcus
*Attorney, Agent, or Firm*—Howard J. Troffkin; William W. McDowell, Jr.

[57] ABSTRACT

A method for forming dried, solid, particulate product from complex sugar solutions by drying the solution in a current of heated air and in the presence of separately introduced recycled dried solids which have undergone additional conditioning to have a moisture content of not greater than about 0.5 percent therein.

3 Claims, 1 Drawing Figure

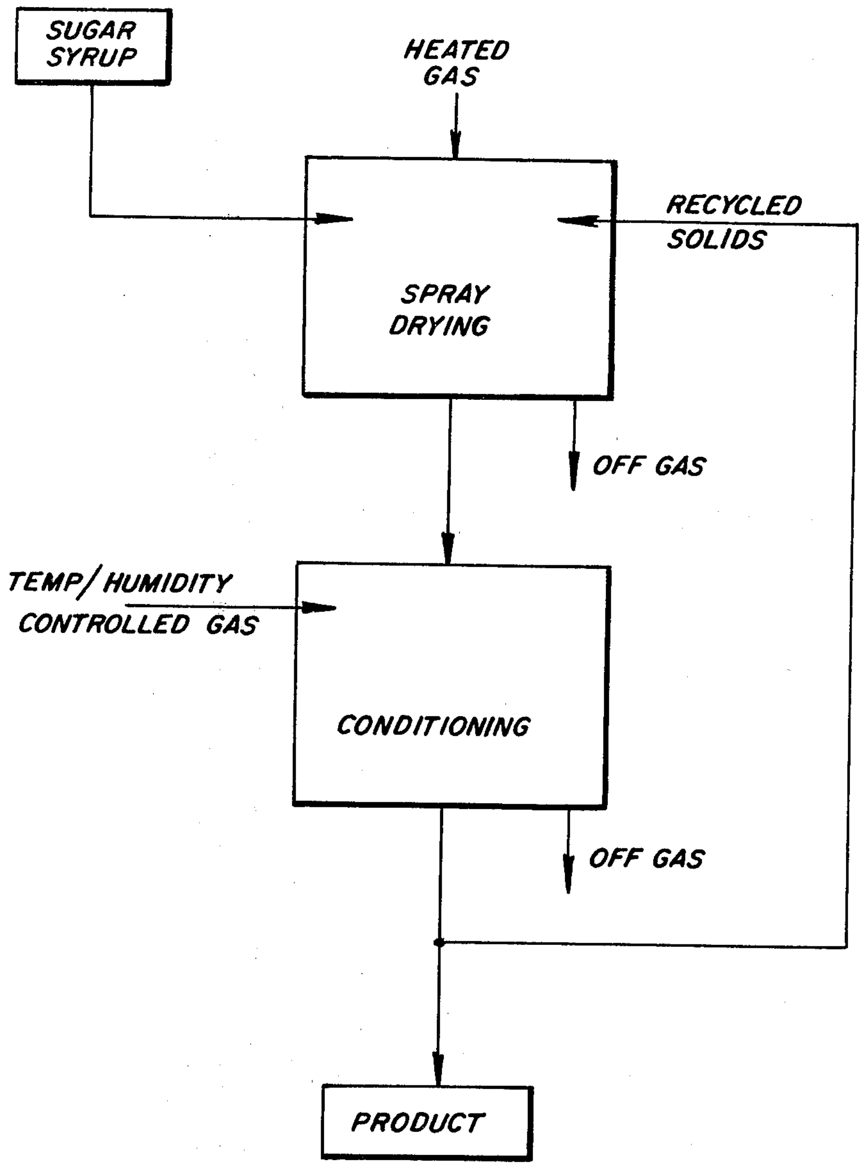
SUGAR
SYRUP
HEATED
GAS
RECYCLED
SOLIDS
SPRAY
DRYING
OFF GAS
TEMP/HUMIDITY
CONTROLLED GAS
CONDITIONING
OFF GAS
PRODUCT

METHOD OF DRYING COMPLEX SUGAR SOLUTIONS

BACKGROUND OF THE INVENTION

The present invention relates to a drying method especially effective for forming solid, particulate and stable product from Complex Sugar Solutions.

U.S. Pat. No. 3,600,222 discloses a drying process for sucrose solutions wherein separate feeds of the solutions and of fine sucrose particles are dispersed in a current of air in a manner which causes the liquid coated on the particles to evaporate and leave a solid product containing substantially all of the sugar fed to the process.

The treatment for fructose solutions, as distinguished from sucrose, is disclosed in U.S. Pat. No. 3,956,009. This patent teaches the desirability of using special conditions for the treatment of fructose solutions, namely, apray drying fructose solutions into a flow of hot air while separately feeding therein solid fructose particles, preferably recycled products. Special temperature conditions were observed with respect to both the inlet and outlet gases.

While the prior art, as represented by these two patents has dealt effectively with the drying of surcose and simple fructose solutions, improvements were found to be desirable for drying and forming a solid, particulate product which is stable to long term storage from mixed or complex sugar syrups, such as, for example, commercially available high fructose corn syrups. The previously known processes do not work effectively with these syrups, but instead produce a sugar product which does not remain in particulate state over extended periods of time.

SUMMARY OF THE INVENTION

The principal object of the present invention is to produce dried, solid particulate products which remain in said state over an extended period of time.

The present invention involves the production of a dried free flowing and stable particulate sugar product from difficultly crystallizable complex sugar solution by a process which comprises spray drying such solutions in the presence of recycled product solids which have been subjected to a new and additional step not present in the prior art, namely, a post-conditioning step wherein the moisture content of the initially spray dried product is reduced to an amount of not greater than one-half percent to form the stable product, part of which is used as the recycled product solids.

BRIEF DESCRIPTION OF THE DRAWING

FIG. 1 is a block diagram of the present process.

DETAILED DESCRIPTION OF INVENTION

The present invention is directed to improvements in the production of dried particulate sugar products from solutions containing mixtures of sugars therein. Such solutions as, for example, commercial high fructose corn syrup (HFCS), have been found, in the past, to be difficultly crystallizable and particulate solids which are conventionally produced generally lack long term storage stability.

The present process comprises initially drying the solution of mixtures of sugars using conventional techinques and equipment such as disclosed in U.S. Pat. Nos. 3,600,222; 3,704,169 and 3,706,599, which teachings are incorporated herein by reference.

It is preferred that this primary drying be done by spray drying technique as taught in the above patent references. Complex sugar solutions which have fructose as one of the major sugar constituents can be initially dried using the spray drying conditions disclosed in U.S. Pat. No. 3,956,009, which teaching is incorporated herein by reference. It has been unexpectedly found that the solid dried product formed from mixed sugars can be made stable to long term storage as a solid, particulate product by subjecting the dried product to a subsequent conditioning step and by utilizing part of the conditioned product as the recycle feed of the drying step.

The conditioning step causes the spray dried product, which normally has a residual moisture content of about one and one-half percent or greater, to be reduced to a level of not greater than one-half percent. This is preferably accomplished by contacting the particulate solid with a gas having less than approximately fifty percent water saturation and having a temperature below its melting point and, preferably, from 60 degrees C. to a temperature of about 10 degrees C. below the melting point of the solid material. Under these conditions, it has been found that the residual water is readily removed to the required low level rendering the material suitable for commercial use as a stable, free flowing, particulate mixed sugar product which exhibits little or none of the undesirable properties imparted by the presence of thermally degraded product. A portion of this product is used as the recycled solid feed of the primary dryer operation.

Equipment required includes: a primary spray dryer, means to supply a drying gas, means to disperse syrup on the particles of recycled solid, and means to separate gaseous and solid products. Further, a conditioning chamber is provided such that the product from the primary dryer can be further treated at a controlled temperature in a gas of controlled relative humidity. A portion of the product from the conditioner is recycled and a portion is taken as product.

FIG. 1 is a flow diagram of the claimed process. The syrup solution containing a mixture of sugars is introduced into a spray dryer along with heated gas and separately introduced recycled conditioned solids. The solid product formed in the spray dryer is subsequently introduced into a conditioning chamber where the previously formed solid is contacted with a conditioning gas having the herein described temperature and humidity conditions to form a solid product having less than 0.5% water content therein. The resultant product is removed from the conditioning chamber and a portion of the resultant solid product is recycled and utilized as the solid feed of the primary dryer operation.

The improved process of the present invention has been unexpectedly found to produce a desirable stable product from mixed or complex sugar solutions such as, for example, commercially known high fruntose corn syrup which comprises approximately 42 percent fructose, approximately 52 percent dextrose and approximately 6 other sugars as a 70 percent solids solution, as well as other fructose solutions which contain substantial amounts of other sugars.

In any drying operation comprising recycling, it is necessary to choose a dry solid starting feed. This may be material obtained from a previous run of a mixed sugar, or one can use any dried particulate such as dextrose or fructose as the starting material. In either case, the initial starting material is largely displaced after several cycles through the unit, and the recycled material obtains the same solids anaylsis as contained in the syrup feed.

In the course of the work leading to this invention, it was found that water removal from a surface by a process comprising distributing syrup on recycled solids critically involves the water content of the recycled solids. It is necessary that the physical conditions of the recycled solids be such that they are handleable in a pneumatic conveying system, and as such are not prone to melting with the formation of non-mobile solids. Thus, as taught in this invention, it is critically important that the water content of the recycled solids be maintained to not greater than 0.5 percent by weight of the recycle solids. Such water content permits free flow of the particulate solids, which is necessary for the overall drying system to function.

The process of the present invention also lends itself readily to the density control of the product so that a higher density may be achieved if desired. It is well known that, on standing, material produced by air crystallization tends to increase in density. This change in density is believed to be caused by intra-particle re-arrangement where high energy areas, such as the edges of the gross particle, tend to round off with a resultant net densification of the particle. Also, in the presence of saturated solution, small crystals tend to dissolve and recrystallize on the surface of large crystals. Thus, within a heterogeneous particle comprising both small and large particles where some surface moisture is present, there would be a tendency for small particles to become part of larger particles. Finally, abrasive contact between particles tends to accelerate crystallization of material contained in a saturated solution existent on a particle surface.

The present process utilizes the foregoing physical realities to readily control the density of the product. When the solids of the spray drier are subjected to a conditioning, such as by their introduction into a fluidized bed conditioner, the addition of water vapor is such as to obtain uniform distribution of said water vapor in the particles existent in a designated volume of the fluidized bed. Controlled humidity gas is introduced into the bottom of the bed at a temperature such that condensation of the vapor within particles is obtained so as to form liquid films within the interstices of the particles to thus facilitate intra-particle material re-arrangement favoring lower surface energy. As the gas passes through the bed, net moisture is removed from the particles. The dryer solid product having a pre-determined moisture content as controlled (1) by the amount of moisture added to accomplish the intra-particle re-arrangement; (2) the moisture in the product from the spray dryer; (3) the moisture in the product from the spray dryer; (4) the moisture contained in the entering air; and (5) that moisture contained in the exit air. Each of the foregoing factors is independently controllable to attain the desired result.

A second means of controlling the density of the product of the present invention comprises the use of a mechanical compactor such that the loosely adherent particles issuing from the spray dryer are mechanically compressed as in a roller briquetting mill so as to physically decrease the void volume existent between the relatively dense micro-crystalline material comprising the aggregate particles. Relatively large briquettes can be formed from the dryer output. These can then be broken as may be desired to supply properly sized recycle particulate material and a product stream.

The density may also be controlled by adjusting the residence time of the spray dryer product in the conditioner to permit the particles of dried product to be in an abrasive contact with each other. The residence time should only be increased within economic limits which permit sufficient formation of the desired product.

Combinations of the foregoing basic means of increasing air crystallized product density may be employed.

The following examples are given for illustrative purposes only and are not meant to limit the scope of the invention except as defined by the claims set forth below. All parts and percentages are by weight except where otherwise indicated.

EXAMPLE I

In a spray drier assembly having a 2.5 foot diameter, a 6 foot drying cylinder and a 3 foot product collection cone, was introduced a feed of 70 Brix HFCS at the rate of 160 parts per minute. The solution was dispersed through fluid nozzles at the bottom of the dryer. Recycled solids from the conditioner were air conveyed to the drying chamber and introduced at the rate of 580 parts per minute via an inlet located about half way up the drying chamber and tangentially to its walls so as to cause the solids and liquid feed to comingle such that the liquid was effectively distributed over the solid particles. Air was introduced at an inlet temperature of 166 degrees C. and had an outlet temperature of 87 degrees C. The solid particulate material issued from the primary dryer had a water content of 1.5 percent. A sample of this product coelesced into a solid, tacky mass within a short period of time.

The solids of the primary drier were conveyed to a conditioning unit in the form of a conventional fluidized bed in which the solids were contacted with dry nitrogen maintained at a temperature of 60 degrees C. The conditioned product and a moisture content of approximately 0.4 percent. A portion of the conditioned product was employed as the recycle solid feed of the primary drier. The remainder of the conditioned product was observed to remain in a solid, particulate form over an extended period and did not have any "burned" taste or noticeable darkening.

EXAMPLE II

Another run was conducted under the conditions and with the apparatus described in Example I above except that the feed solution contained a 70 percent solids content of a mixture of fructose and sucrose in a ratio of 1:1.3. The conditioned product was a stable, free flowing, particulate material.

While the invention has been described in terms of certain preferred embodiments, it is not intended to limit the invention to the particular forms set forth but, on the contrary, it is intended to cover such alternatives, modifications and equivalents as may be included within the spirit and scope of the invention as defined by the appended claims.

What is claimed is:

1. A process suitable for drying complex sugar solutions to form stable, solid, particulate product therefrom comprising (a) drying in a drying zone dispersed complex sugar solutions in a current of heated gas and in the presence of from about 1 to 10 parts by weight of separately introduced recycled conditioned solids per part by weight of solids in solution to produce a solid product; said heated gas has an inlet temperature of from about 100 to 300 degrees C. and an outlet temperature of from about 60 to 120 degrees C;

(b) contacting in a conditioning zone the formed solid product with a conditioning gas having a humidity of less than 50% and having a temperature below the melting point of the formed solid for a time sufficient to reduce the water content of said solids to not greater than 0.5 percent; and (c) recycling a portion of said conditioned solids to said drying zone to be used as said recycled solids in step (a).

2. The process of claim 1 wherein the conditioning gas has a temperature ranging from about 60 degrees C. up to about 10 degrees C. below the melting point of the formed solid product.

3. The process of claim 1 wherein the product is abrasively compacted to increase the density thereof.

* * * * *